(12) United States Patent
Archambeau et al.

(10) Patent No.: US 8,801,177 B2
(45) Date of Patent: Aug. 12, 2014

(54) ELECTRICALLY CONTROLLABLE OPTICAL COMPONENT COMPRISING AN ARRAY OF CELLS

(75) Inventors: Samuel Archambeau, Charenton le Pont (FR); Jean-Paul Cano, Charenton le Pont (FR); Christian Bovet, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 1514 days.

(21) Appl. No.: 12/446,370

(22) PCT Filed: Oct. 17, 2007

(86) PCT No.: PCT/EP2007/061090
§ 371 (c)(1),
(2), (4) Date: Sep. 17, 2010

(87) PCT Pub. No.: WO2008/046858
PCT Pub. Date: Apr. 24, 2008

(65) Prior Publication Data
US 2011/0013136 A1 Jan. 20, 2011

(30) Foreign Application Priority Data
Oct. 19, 2006 (FR) .................................. 06 09183

(51) Int. Cl.
*G02C 7/00* (2006.01)
*G02C 7/02* (2006.01)
*G02C 7/06* (2006.01)

(52) U.S. Cl.
USPC .................................. 351/159.39; 351/159.01

(58) Field of Classification Search
USPC ............. 351/159.01–159.06, 159.39–159.42, 351/159.68, 159.73–159.75
See application file for complete search history.

(56) References Cited

U.S. PATENT DOCUMENTS

| 2,196,066 | A | 4/1940 | Feinbloom |
| 2,511,329 | A | 6/1950 | Craig |
| 3,460,960 | A | 8/1969 | Francel et al. |
| 3,532,038 | A | 10/1970 | Rottman et al. |

(Continued)

FOREIGN PATENT DOCUMENTS

| AU | 779628 | 2/2005 |
| CA | 2340672 | 12/2000 |

(Continued)

OTHER PUBLICATIONS

Hecht, Eugene, "Optics, $4^{th}$ Edition" 2002 Addison Wesley, p. 428 (XP002465206).

(Continued)

*Primary Examiner* — James Greece
(74) *Attorney, Agent, or Firm* — Occhiuti & Rohlicek LLP

(57) ABSTRACT

An electrically controllable optical component (10) comprises a transparent array of cells (3) and two transparent electrodes (5a, 5b) which are parallel and lying opposite each other on either side of the array of cells. Certain of the cells located between the two electrodes contain different electroactive materials, so that said cells exhibit different respective variations in at least one optical quantity in response to an electrical signal applied to the electrodes. An optical function is thus temporarily conferred on the component, resulting from gradients in the optical quantity that are formed parallel to the surface of the component.

35 Claims, 1 Drawing Sheet

(56) References Cited

U.S. PATENT DOCUMENTS

| | | | |
|---|---|---|---|
| 3,628,854 A | 12/1971 | Jampolsky | |
| 3,978,580 A | 9/1976 | Leupp et al. | |
| 4,150,878 A | 4/1979 | Barzilai et al. | |
| 4,268,132 A | 5/1981 | Neefe | |
| 4,601,545 A | 7/1986 | Kern | |
| 4,621,912 A | 11/1986 | Meyer | |
| 4,720,173 A | 1/1988 | Okada et al. | |
| 4,791,417 A | 12/1988 | Bobak | |
| 4,994,664 A | 2/1991 | Veldkamp | |
| 5,017,000 A | 5/1991 | Cohen | |
| 5,044,742 A | 9/1991 | Cohen | |
| 5,067,795 A | 11/1991 | Senatore | |
| 5,139,707 A | 8/1992 | Guglielmetti et al. | |
| 5,233,038 A | 8/1993 | Guglielmetti et al. | |
| 5,359,444 A | 10/1994 | Piosenka et al. | |
| 5,529,725 A | 6/1996 | Guglielmetti et al. | |
| 5,576,870 A | 11/1996 | Ohmae et al. | |
| 5,585,968 A | 12/1996 | Guhman | |
| 5,604,280 A | 2/1997 | Pozzo et al. | |
| 5,699,142 A | 12/1997 | Lee et al. | |
| 5,733,077 A | 3/1998 | MacIntosh | |
| 5,763,054 A | 6/1998 | Samec et al. | |
| 5,764,333 A | 6/1998 | Somsel | |
| 5,774,273 A | 6/1998 | Bornhorst | |
| 5,805,263 A | 9/1998 | Reymondet et al. | |
| 5,807,906 A | 9/1998 | Bonvallot et al. | |
| 5,812,235 A | 9/1998 | Seidner et al. | |
| 5,905,561 A | 5/1999 | Lee et al. | |
| 5,914,802 A | 6/1999 | Stappaerts et al. | |
| 6,019,914 A | 2/2000 | Lokshin et al. | |
| 6,091,546 A * | 7/2000 | Spitzer | 359/618 |
| 6,118,510 A | 9/2000 | Bradshaw et al. | |
| 6,199,986 B1 | 3/2001 | Williams et al. | |
| 6,259,501 B1 | 7/2001 | Yaniv | |
| 6,274,288 B1 | 8/2001 | Kewitsch et al. | |
| 6,281,366 B1 | 8/2001 | Frigoli et al. | |
| 6,301,051 B1 | 10/2001 | Sankur | |
| 6,307,243 B1 | 10/2001 | Rhodes | |
| 6,309,803 B1 | 10/2001 | Coudray et al. | |
| 6,327,072 B1 | 12/2001 | Comiskey et al. | |
| 6,449,099 B2 | 9/2002 | Fujimoto et al. | |
| 6,485,599 B1 | 11/2002 | Glowina et al. | |
| 6,577,434 B2 | 6/2003 | Hamada | |
| 6,597,340 B1 | 7/2003 | Kawai | |
| 6,707,516 B1 | 3/2004 | Johnson et al. | |
| 6,712,466 B2 | 3/2004 | Dreher | |
| 6,871,951 B2 * | 3/2005 | Blum et al. | 351/159.03 |
| 6,934,088 B2 | 8/2005 | Lai et al. | |
| 6,963,435 B2 | 11/2005 | Mallya et al. | |
| 6,987,605 B2 | 1/2006 | Liang et al. | |
| 7,036,929 B1 | 5/2006 | Harvey | |
| 7,144,529 B1 | 12/2006 | Mercier | |
| 7,227,692 B2 | 6/2007 | Li et al. | |
| 7,289,260 B2 | 10/2007 | Kaufman et al. | |
| 7,404,637 B2 | 7/2008 | Miller et al. | |
| 7,533,453 B2 | 5/2009 | Yancy | |
| 7,715,107 B2 | 5/2010 | Loopstra et al. | |
| 2002/0008898 A1 | 1/2002 | Katase | |
| 2002/0016629 A1 | 2/2002 | Sandstedt et al. | |
| 2002/0080464 A1 | 6/2002 | Bruns | |
| 2002/0114054 A1 | 8/2002 | Rietjens | |
| 2002/0140899 A1 | 10/2002 | Blum et al. | |
| 2002/0145797 A1 | 10/2002 | Sales et al. | |
| 2002/0167638 A1 | 11/2002 | Byun et al. | |
| 2002/0176963 A1 | 11/2002 | Chen et al. | |
| 2003/0003295 A1 | 1/2003 | Dreher | |
| 2003/0021005 A1 | 1/2003 | Liang et al. | |
| 2003/0035199 A1 | 2/2003 | Liang et al. | |
| 2003/0081172 A1 | 5/2003 | Dreher | |
| 2003/0085906 A1 | 5/2003 | Elliott et al. | |
| 2003/0143391 A1 | 7/2003 | Lai | |
| 2003/0147046 A1 | 8/2003 | Shadduck | |
| 2003/0152849 A1 | 8/2003 | Chan-Park et al. | |
| 2003/0174385 A1 | 9/2003 | Liang et al. | |
| 2003/0206260 A1 | 11/2003 | Kobayshi et al. | |
| 2004/0008319 A1 | 1/2004 | Lai et al. | |
| 2004/0027327 A1 | 2/2004 | LeCain et al. | |
| 2004/0051833 A1 | 3/2004 | Hain et al. | |
| 2004/0114111 A1 | 6/2004 | Watanabe | |
| 2004/0120667 A1 | 6/2004 | Aylward et al. | |
| 2004/0125247 A1 | 7/2004 | Seshan et al. | |
| 2004/0125337 A1 | 7/2004 | Boulineau et al. | |
| 2004/0165252 A1 | 8/2004 | Liang et al. | |
| 2004/0169932 A1 | 9/2004 | Esch et al. | |
| 2004/0190115 A1 | 9/2004 | Liang et al. | |
| 2004/0233381 A1 | 11/2004 | Kim et al. | |
| 2006/0006336 A1 | 1/2006 | Cano et al. | |
| 2006/0087614 A1 | 4/2006 | Shadduck | |
| 2006/0279848 A1 | 12/2006 | Kuiper et al. | |
| 2007/0152560 A1 | 7/2007 | Naito et al. | |
| 2008/0068723 A1 | 3/2008 | Jethmalani et al. | |
| 2008/0208335 A1 * | 8/2008 | Blum et al. | 623/6.22 |
| 2008/0212018 A1 | 9/2008 | Ballet et al. | |
| 2008/0314499 A1 | 12/2008 | Begon et al. | |

FOREIGN PATENT DOCUMENTS

| | | |
|---|---|---|
| DE | 19714434 | 10/1998 |
| EP | 728572 | 8/1996 |
| EP | 1225458 | 7/2002 |
| EP | 1308770 | 5/2003 |
| FR | 2561005 | 9/1985 |
| FR | 2718447 | 10/1995 |
| FR | 2872589 | 1/2006 |
| JP | 61-140920 | 6/1986 |
| JP | 61-177428 | 8/1986 |
| JP | 05-027214 | 2/1993 |
| JP | 11-142806 | 5/1999 |
| JP | 11-352453 | 12/1999 |
| JP | 2003-504665 | 2/2003 |
| JP | 2004-527785 | 9/2004 |
| JP | 2005-128518 | 5/2005 |
| WO | 00/77570 | 12/2000 |
| WO | 01/02895 | 1/2001 |
| WO | 02/01281 | 1/2002 |
| WO | 02/065215 | 8/2002 |
| WO | 03/012542 | 2/2003 |
| WO | 03/077012 | 9/2003 |
| WO | 03/102673 | 12/2003 |
| WO | 2004/015481 | 2/2004 |
| WO | 2004/034095 | 4/2004 |
| WO | 2004/051354 | 6/2004 |
| WO | 2005/033782 | 4/2005 |
| WO | WO 2006/013250 | 2/2006 |
| WO | 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Cognard, Philippe. "Colles et adhesifs pour emballages, Generalities," 18 pages (English Summary Provided).

Fowles, Grant R. Introduction to Modern Optics. New York: Dover Publications, 1989. Print. pp. 138-139.

Kaufman U.S. Appl. No. 60/507,940 Drawing Sheets 4, 5.

David R. Lide, ed., CRC Handbook of Chemistry and Physics, 89th edition (internet version 2009), CRC Press/Taylor and Francis, Boca Raton, FL., pp. 10-12 through 10-13.

Perez, Jose-Philippe, (Optique—Fondement et applications [Optics—Fundamentals and Applications], 7th edition, Paris 2004, p. 262) (English summary provided).

* cited by examiner

ELECTRICALLY CONTROLLABLE OPTICAL COMPONENT COMPRISING AN ARRAY OF CELLS

CROSS-REFERENCE TO RELATED APPLICATIONS

This application is the National Stage of International Application No. PCT/EP2007/061090, filed Oct. 17, 2007, which claims priority to French Application No. 0609183, filed Oct. 19, 2006. The contents of both applications are hereby incorporated by reference in their entirety.

The present invention relates to a transparent optical component which may be electrically controlled and comprises an array of juxtaposed cells parallel to one surface of this component.

Many components already exist which comprise arrays of cells each containing a portion of one and the same electroactive material. The cells are electrically controlled by electrodes that are individually dedicated to these cells. In other words, each cell is associated with two electrodes that are exclusively assigned to controlling the optical state of said cell. The component therefore comprises as many pairs of electrodes as there are cells, so as to allow the state of each cell to be controlled independently of the other cells. To produce all the electrodes is therefore a complex and onerous task, as is making the power supply connections that connect the electrodes. Furthermore, each electrode of an individual cell, and also its connection, causes light diffraction when the cells are of small dimensions. This diffraction itself generates macroscopic scattering. In other words, the component is not transparent, or else its level of transparency is not sufficient for certain applications of the component, such as for example ophthalmic applications.

Within the context of the invention, an optical component is considered to be transparent when an image observed through this component is perceived without any significant loss of contrast. In other words, interposing a transparent optical component between an image and a person observing said image does not significantly reduce the quality of the image. In particular, the diffraction is defined as the phenomenon of light scattering observed when a light wave is physically bounded (J-P. Perez, "Optique, Fondements et Applications [*Optics, Basics and Applications*]", 7th edition, published by Dunod, October 2004, page 262). Because of the diffraction, a light spot is no longer perceived as a spot through a diffracting optical component. The resulting macroscopic scattering, or incoherent scattering, produces a milky appearance, or a scattering halo, of the pixelated structure of the optical component. This results in a loss of contrast of the image observed through the component. This loss of contrast can be likened to a loss of transparency, as defined above.

It is also known to produce an ophthalmic lens that incorporates an electroactive substance contained in a single cavity extending over the entire surface of the lens. Transparent electrodes are placed facing each other on either side of the cavity, in order to control the state of the substance. Depending on this state, an optical characteristic of the glass varies. For example, the light absorption of an electrochromic lens varies according to an electrical voltage applied between two electrodes placed parallel to the surface of the lens. Such components may be highly transparent in the sense that the sharpness and the perception contrast of an image through them are not degraded. However, the electrically controllable optical functions of this type of component are few and very simple, so that the variety of these components is limited.

Finally, transparent optical components have also been described that include a single cavity filled with an electroactive material and in which the shape of the electrodes that are used to control the state of the electroactive material is designed to create variations in their state between various points in the cavity. In other words, the optical function of the electrically controllable component results from spatial variations in the state of the electroactive material that are created by the non-uniform distribution of the electrical signal in the cavity. Using electrodes of different shapes, a larger number of electrically controllable optical functions may thus be obtained. However, in this case, the edges of the electrodes are visible on the optical component, this not being compatible with certain uses of said component. Furthermore, the variation in the shape of the electrodes between two optical components manufactured in succession is difficult to control, and is not compatible with low-cost production of optical components having different optical functions.

One object of the present invention is therefore to provide an electrically controllable transparent optical component structure that alleviates the drawbacks mentioned above.

To do this, the invention provides an electrically controllable transparent optical component comprising:
  a transparent array of hermetically sealed cells juxtaposed parallel to one surface of the component; and
  two transparent electrodes parallel to the surface of the component and lying opposite each other in a direction normal to the surface of the component.

According to the invention, several juxtaposed cells are located between the two electrodes and contain different respective electroactive materials, so that said cells exhibit different respective variations in at least one optical quantity in response to an electrical signal applied to the two electrodes, said two electrodes having an extension corresponding substantially to the entire area of the optical component.

Within the context of the invention, the term "electroactive materials" (or "electrooptic materials") is understood to mean any material having at least one optical property that varies by application of an electrical stimulus.

Thus, the optical component possesses a multicellular structure, which furthermore incorporates a pair of electrodes suitable for simultaneously controlling the state of the electroactive materials contained in several cells. The two electrodes, together with the possible connections needed to electrically connect them, are then simple to produce and may have edges lying outside the regions of the optical component where such edges would be an impediment or would be aesthetically unattractive. In this way, the optical component may exhibit high transparency, which is reduced neither by the structure of the electrodes nor by the power supply connections for the latter.

Furthermore, the optical function of the electrically controllable component results from variations, from one cell to another, in the electrooptic materials that are contained therein. Thus, different electrically controlled functions may be obtained with identical electrodes, by modifying only the electroactive materials that are contained in cells corresponding to identical locations on the surface of several optical components.

When the two electrodes of such a component are electrically powered, they create a substantially uniform electric field in all the cells that are located between them. The respective responses of the electrooptic materials that are contained in these cells differ thanks to the variations in the electroactive materials themselves that are contained in the cells. In other words, each cell responds in a particular way, which depends on the electrooptic material that is contained therein.

The electrical function, which is controlled by the electrical signal, is therefore initially written into the optical component, by varying the electrooptic materials that are introduced into different cells. This function is subsequently activated by the electrical control, depending on the requirements of the person using the component. The optical function that is activated by the electrical signal is therefore obtained over the entire component.

When the operation of filling the cells with the electroactive materials is carried out by a printing head, or a head for spraying droplets of these electroactive materials, a variation in the distribution of the electroactive materials in the cells may be easily, rapidly and inexpensively obtained by modifying the program for operating the head.

Moreover, hermetically sealing each cell ensures that different electroactive materials contained in neighbouring cells cannot become mixed during use of the optical component. In this way, the component may be used for a long time without appearance of a loss of functionality due to the progressive mixing of materials contained in adjacent cells.

In one embodiment of the invention, each cell is hermetically sealed by depositing a continuous, homogeneous film of a plastic having a constant thickness of 10 nm to 500 nm (nanometers), said film being between the cells and the electrodes. This continuous film, forming a conformal coating, advantageously consists of poly(para-xylylene), also called "parylene". Such an embodiment allows the distance between the electrodes and the electroactive material contained in the cells to be optimized, this minimization of the distance optimizing the actual voltage applied to said materials following an electrical pulse applied to the electrodes. Minimizing this distance prevents the losses due to the presence of a dielectric between the electroactive material and the electrode, thereby enabling a higher effective voltage to be delivered to the electroactive material contained in the cells. In such an embodiment of the invention, the component may be completely sealed by laminating or bonding a film of plastic, such as a film of polyethylene terephthalate.

According to one particular embodiment, the invention also comprises an electrically controllable transparent optical component as described above in which some of the cells located between the two electrodes contain different respective electroactive materials and other cells located between the two electrodes contain non-electroactive materials so that said materials are not sensitive to an electrical signal applied to the two electrodes. In this specific embodiment, the optical component may furthermore comprise several pairs of transparent electrodes parallel to the surface of the component, each pair of electrodes being placed opposite each other in a parallel direction normal to said surface of the component, and having an extension corresponding to the regions formed by the cells containing electroactive materials. In this particular embodiment of the invention, the optical function that is activated by the electrical signal is obtained only on that part of the component comprising regions in which the cells are filled with electroactive materials, these being connected to a pair of electrodes. It will be understood that, within the context of the invention, the pairs of electrodes will have to be placed on the surface of the optical component in such a way that they do not degrade the transparency of the component. Thus, if the optical component comprises several pairs of electrodes, these will have at least one extension that extends up to a part of the periphery of the optical component, and the possible connections that are needed to connect the electrodes are also made in this/these peripheral region(s), so as to limit any impediment or unattractive feature within the optical component.

According to one embodiment of the invention, an additional layer, called a quarter-wave plate, may advantageously be present parallel to one surface of the electrode, this being located on the surface present on the opposite side from the surface of the electrode that is in contact with the transparent array of cells. Such a quarter-wave plate makes it possible in particular to increase the transparency of the optical component by limiting the birefringence. This quarter-wave plate may thus have a refractive index that is adjusted between that of the material making up the electrode and that of the material making up the substrate of the optical component.

This is because the electrode and the substrate of the optical component may in particular have different refractive indices, and consequently interference fringes due to this index difference appear at this interface. These interference fringes may constitute an impediment as regards the optical function of the optical component and in particular may disturb the transparency of such a component. By incorporating a quarter-wave plate between the support substrate of the optical component and the electrode it is possible to eliminate this interference. The optical and geometric characteristics of a quarter-wave plate are given by the following equations:

$$n = (n_s \times n_v)$$

$$n \times e = \lambda/4$$

where n is the refractive index at 25° C. for a wavelength $\lambda = 550$ nm of the quarter-wave plate (the wavelength corresponding to the eye's maximum sensitivity), $n_s$ is the refractive index at 25° C. for a wavelength $\lambda = 550$ nm of the substrate of the optical component and $n_v$ is the refractive index at 25° C. for a wavelength $\lambda = 550$ nm of the electrode directly in contact with the quarter-wave plate.

In other words, the index n of the quarter-wave plate is the geometric mean of the indices of the materials surrounding it.

Knowing the refractive indices of the substrate $n_s$ and of the electrode $n_v$ (for example at 25° C. and for a wavelength $\lambda = 550$ nm), the above formulae may be used to determine a priori the thickness e and the refractive index n of the quarter-wave plate.

The quarter-wave plate comprises at least one colloidal mineral oxide generally chosen from $SiO_2$, $TiO_2$, $ZrO_2$, $SnO_2$, $Sb_2O_3$, $Y_2O_3$, $Ta_2O_5$ and mixtures thereof. The preferred colloidal mineral oxides are $SiO_2$, $TiO_2$, $ZrO_2$, and $SiO_2/TiO_2$ and $SiO_2/ZrO_2$ mixtures. In the case of a mixture of colloidal mineral oxides, the mixture preferably comprises at least one high-index oxide, that is to say one having a refractive index at 25° C. $n_D \geq 1.54$ and at least one low-index oxide, that is to say one having a refractive index at 25° C. $n_D < 1.54$. Preferably, the mineral oxide mixtures are binary mixtures, in particular of a low-index oxide and a high-index oxide. In general, the low-index oxide/high-index oxide weight ratio varies from 20/80 to 80/20, preferably 30/70 to 70/30 and better still 40/60 to 60/40.

The size of the mineral oxide particles generally varies from 10 to 80 nm, preferably 30 to 80 nm and better still from 30 to 60 nm. In particular, the mineral oxide may consist of a mixture of small particles, that is to say those with a size of 10 to 15 nm, and of large particles, that is to say with a size of 30 to 80 nm.

Typically, the quarter-wave plate of colloidal mineral oxide has a thickness of 60 to 100 nm, preferably 70 to 90 nm and better still 80 to 90 nm, it being understood that this thickness must also be as close as possible to the theoretical thickness of a quarter-wave plate, taking into account the materials used for the optical component, for the optimum attenuation of the interference fringes.

This quarter-wave plate is generally applied by vacuum deposition using one of the following techniques: evaporation, possibly ion-beam evaporation, ion-beam sputtering, cathode sputtering, plasma-enhanced chemical vapour deposition.

An optical component according to the invention may comprise illumination device optics, an optical lens, for example an optical instrument lens intended to measure, display or form images (such as a microscope lens, a telephoto lens or a zoom), a contact lens, an ophthalmic lens designed to be fitted into the frame of a pair of spectacles, a helmet sight, the glass of a protective mask or sports goggles, an optical power additional insert intended to be bonded onto another lens, etc.

The electroactive materials that are contained in the cells may comprise polar molecules exhibiting polarization anisotropy. The electric field that is generated by means of the electrodes modifies the orientation of the molecules in each cell located between the electrodes in such a way that an apparent dielectric permittivity varies within each cell. In particular, variations in dielectric permittivity between neighbouring cells may be achieved by varying the concentration of the anisotropic molecules within said cells. When the electrical signal is applied to the two electrodes, the electroactive materials that are contained in these cells then exhibit different respective variations in an optical refractive index. An optical refractive index gradient is thus formed in the optical component, parallel to the surface of the latter, which is capable of giving the component special optical functions.

Depending on the electroactive materials that are contained in the cells located between the two electrodes and on the distribution of these materials, the optical component may acquire one of the following functions, or possibly a combination of said functions, in response to the electrical signal applied to the two electrodes, namely those of:

producing a variable wavefront deformation for light passing through the component; the electrical signal applied to the electrodes enables the retardation function of the phase plate to be modified, thereby introducing a deformation of the wavefront;

conferring a variable prismatic power;

forming a variable holographic grating;

when the component is an optical lens, reversibly modifying an optical power of the lens;

variably correcting at least one optical aberration of the lens, such as for example a geometric aberration or a chromatic aberration; and when the component is a progressive ophthalmic lens intended to be fitted into the frame of a pair of spectacles, also called a PAL (progressive addition lens), variably modifying a design of this lens.

In the case of the latter function, the electrical signal may cause a progressive ophthalmic lens design suitable for example for a reading activity to pass to a design suitable for a distance-vision activity, such as for a sport or for driving a motor vehicle for example.

One advantage of the invention lies in the fact that the electrically controlled functions may be independent of the polarization of the light passing through the optical component. In this case, all or most of the intensity of the incident light may be transmitted through the component, so that almost no darkening effect appears when an image is observed through the component.

The invention also provides a pair of spectacles that comprises an ophthalmic lens forming an optical component as described above. Such a pair of spectacles may possess characteristics that are adapted to two different types of situation for a person wearing the spectacles. The wearer may then modify the characteristics of his spectacles according to his activity so as to obtain greater comfort.

Other features and advantages of the present invention will become apparent in the following description of a non-limiting exemplary embodiment, with reference to the appended drawings in which.

Although the invention will now be described in detail within the context of an ophthalmic lens, or spectacle lens, it should be understood that it is not limited to this particular example but may be applied to other types of transparent optical components.

Furthermore, it should be understood that, for the sake of clarity of the figures, the dimensions of the parts shown do not correspond to actual dimensions or ratios of dimensions.

Figure 1:
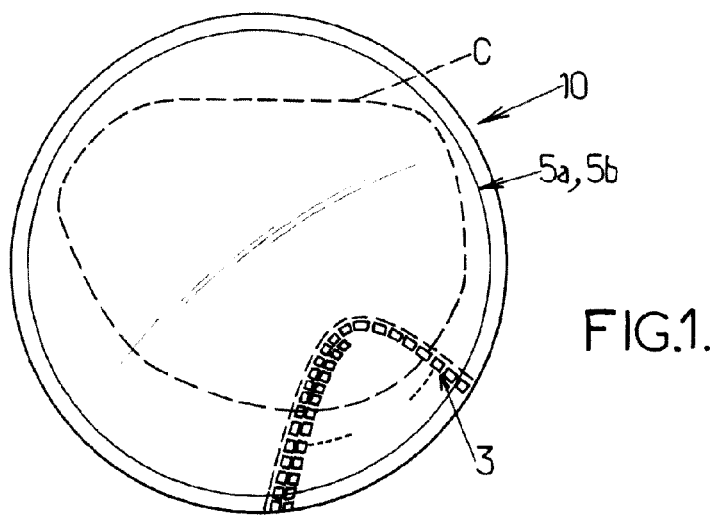
FIG. 1 is a plan view of an ophthalmic lens according to the invention.
Figure 2:
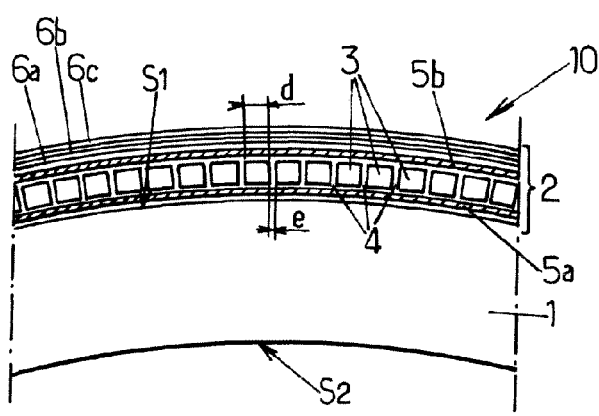
FIG. 2 is a sectional view of a lens as per FIG. 1.

As shown in FIGS. 1 and 2, a spectacle lens blank 10, also called an ophthalmic lens blank, comprises a substrate 1 having a convex anterior surface S1 and a concave posterior surface S2. The substrate 1 may itself be an ophthalmic lens blank as currently used at the present time. It may be made of an organic, mineral or composite material. It may also itself possess an optical function, such as an ophthalmic correction, a solar protection function, a photochromic function, etc. As is known, such a blank 10 is intended to be machined along an outline denoted by C so as to form a lens that can then be fitted into the frame of a pair of spectacles.

One of the surfaces S1 or S2 of the lens 10, for example the anterior surface S1, may include an array of cells 3 that are juxtaposed, one beside another, parallel to this surface, so as to form a paving of the surface. This paving may have any pattern: square, triangular, hexagonal or random. In FIG. 1, a partial cut-away shows a square paving formed by the cells 3, given as an example. The cells 3 are separated by walls approximately perpendicular to the surface S1. The dimension d of the cells 3 measured parallel to the surface S1 and the thickness e of the walls 4 are selected in such a way that the total area occupied by the cells 3 corresponds to a high coverage ratio of the lens 10. This coverage ratio, also called the fill factor, is preferably greater than 95%, or even greater than 98%. In this way, the function conferred by the cells 3 on the lens 10 has a high effectiveness.

Furthermore, the dimension d of the cells and the thickness e of the walls are also selected so as not to cause light scattering or diffraction, which would be irksome to the person wearing the lens, or would be unattractive. To do this, the dimension d is preferably greater than 1 μm. In addition, this dimension is advantageously less than 500 μm, so that each cell 3 cannot be individually distinguished by the naked eye. The lens 10 thus meets the aesthetic criteria usually adopted in the ophthalmic field. Preferably, the dimension d of the cells is between 5 μm and 200 μm, and the thickness e of the walls 4 is generally between 0.1 μm and 5 μm, and advantageously between 1 μm and 3 μm.

The depth of the cells, that is to say the height of the wall 4 perpendicular to the surface S1, is preferably between 1 μm and 50 μm. In one particular exemplary embodiment, it is equal to 10 μm. Such systems are for example described in Patent Application WO 2006/013250.

Two electrodes, referenced 5a and 5b, are placed on either side of the array of cells 3, parallel to the surface S1. As shown in FIG. 1, the electrodes 5a and 5b have outlines that are preferably superposed on and located close to the peripheral edge of the lens blank 10. The electrodes 5a and 5b make it possible to create a substantially uniform electric field across the cells when said electrodes are powered by an electrical voltage supply. This electric field is oriented perpendicular to the electrodes 5a and 5b.

The array of cells 3 is made of transparent or absorbent materials using techniques well known to those skilled in the art, such as that described for example in Patent Applications WO 2006/013250 or FR 05/07722. The electrodes 5a, 5b are advantageously made of transparent conducting materials such as a conducting oxide material like indium-doped tin oxide or ITO, or a conducting polymer, for example polyaniline, polyacetylene, or PEDOT. The electrodes 5a, 5b may also each be formed from thin metal layers, such as silver layers. They are then advantageously combined with other layers of appropriate thickness and refractive index, in order to have a sufficient level of transparency. Among these other layers, mention may in particular be made of quarter-wave layers, which represent one particular embodiment of the invention. The array of cells 3 and the electrodes 5a, 5b are advantageously designed to be cut at the same time as the substrate 1 during the operation of machining it.

The electrode 5a, the array of cells 3 and the electrode 5b may be formed in succession on the surface S1 of the substrate 1. Optionally, additional treatments may be applied on top of the electrode 5b, in order to impart improved characteristics on the final lens. Such treatments, known to those skilled in the art, may consist in forming one of the following layers, or a combination thereof: an impact-resistant layer 6a, an antireflection multilayer 6b and an anti-fouling layer 6c. Other additional treatments may also be applied to the lens after formation of the electrode 5b.

In one particular embodiment of the invention, a plastic film advantageously consisting of poly(para-xylylene) (or parylene) is deposited conformally between the electrode 5b and the array of cells 3 filled with one or more electroactive materials. The parylene is deposited by evaporating a parylene dimer at 150° C. Pyrolysing at 680° C. produces a gaseous reactive monomer that is vacuum-deposited, which, by polymerizing, thus forms a continuous insulation film both on the walls 4 of the cells and on the electro-active materials filling each of the cells. The electrode 5b is then formed on said continuous, homogeneous and uniformly thick film made of parylene.

According to an alternative embodiment of the invention, the electrode 5a, the array of cells 3, the electrode 5b and optionally the layers 6a-6c, together with the parylene film, may form a thin two-dimensional structure on a flexible transparent film support, which is attached to the surface S1 of the substrate 1. Such a structure, referenced 2 in FIG. 2, can then be manufactured independently of the substrate 1 and then machined and bonded to one of the faces of said substrate, according to the requirements of a person intended to wear the lens 10. The overall thin two-dimensional structure on the flexible support forms a transparent functional film. In such a configuration of the invention, the optical component must in particular have characteristics allowing it to be bonded to a curved surface, such as that formed by an optical lens or an ophthalmic lens. The optical component must thus comprise materials, especially at the electrodes, which are capable of undergoing deformation, be it minimal, by a thermoforming process, the latter being particularly suitable for integrating the transparent optical component into an ophthalmic lens. A person skilled in the art may in particular refer to Patent FR 05/03306 describing such a process for applying a plane surface to a curved surface.

The cells 3, which are located between the electrodes 5a and 5b, are hermetically sealed so that each permanently contains an electroactive material. When these electroactive materials are liquids, or possibly gels, they may be simply introduced into the cells 3 before they are closed off, for example using a printing head, especially of the material jet type. Such a head comprises several liquid projection orifices, which may be supplied respectively by reservoirs of different liquid electroactive materials. It is therefore easy, by programming the positioning of the printing head in front of the array of cells 3 and by activating the liquid projection by one of the orifices, to fill the cells 3 with different materials depending on the position of each cell on the surface S1. Once the cells 3 have been filled, they may be closed off by a continuous film that is sealed or bonded onto the tops of the walls 4. The electrode 5b is then supported by this film. In the case in which the optical component comprises cells containing non-electroactive materials, these are also liquids or possibly gels. Thus, these cells may be filled by the same material jet device as that used previously.

The electroactive materials that are contained in the cells 3 may consist of at least two material components that are common to these cells and are mixed in each cell 3 in mixture proportions that vary according to the cell. When the two material components are liquids, it is then sufficient for the printing head to have two orifices connected to two feed reservoirs for each of the components. The desired proportions of each component in each cell 3 may then be obtained by suitably controlling the amount of each component that is projected into the cell by the printing head.

According to one particular embodiment of the invention, the mixtures constituting the electroactive materials contained in at least certain of the cells 3 comprise at least one liquid crystal. The proportion of this liquid crystal in the mixtures varies among certain of the cells 3 so as to confer thereon different variations in an optical refractive index in response to the application of an electrical voltage between the electrodes 5a and 5b. The optical characteristic of each cell, which is modified upon applying the voltage, is therefore the apparent optical refractive index of the material contained in the cells. The refractive index gradients, which are oriented parallel to the surface S1, may thus be temporarily and reversibly generated by means of an electrical control. These gradients, which are initially determined by the variations in the composition of the electroactive materials contained in the cells 3, form a phase grating or spatial light modulator (SLM). They may correspond to different optical functions. Examples of such functions have already been mentioned above. A person skilled in the art knows the gradient profile that it is necessary to generate in order to obtain a particular optical function. Preferably, the electroactive material contained in at least one of the cells 3 has an optical refractive index variation of greater than 0.02, preferably between 0.02 and 0.2 or even possibly greater than 0.2, in response to the electrical signal applied between the two electrodes. In this way, the optical function of the electrically controllable lens 10 may have a sufficient amplitude.

This optical function may be switched between two predefined fixed states in a binary fashion. Alternatively, a continuous variation of the optical function may be controlled, between two extreme states, by means of an appropriate progressive electrical control.

Figure 3:
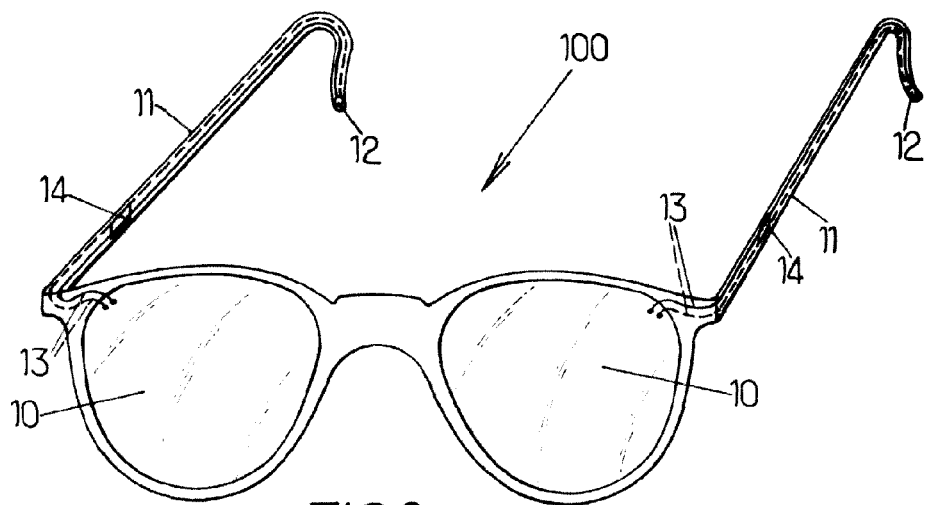
FIG. 3 illustrates a pair of spectacles provided with lenses according to FIGS. 1 and 2.

FIG. 3 shows a pair of spectacles 100 that incorporates two lenses 10 as described above. The spectacles 100 comprise a frame with two sides 11, into which frame the lenses 10 are fitted. It furthermore includes at least one electrical signal source 12 and electrical connections 13 which connect each of the lenses 10 to a source 12. Each source 12 may be a cell or battery of appropriate dimensions. Two connections 13 are needed to deliver the electrical signal to each of the lenses 10. These two connections are connected to the electrodes 5a and 5b of the lens, respectively. To do this, each connection 13 may be equipped with a terminal suitable for coming into contact with one of the electrodes 5a, 5b of the lens when the latter is fitted into the frame. Furthermore, a control device 14 may be placed on one or more of the connections 13 in order to allow the electrical signal to be transmitted between the source 12 and at least one of the lenses 10. The control device 14 may be a manual control device or an automatic control device depending on a signal delivered by a detector incorporated into the spectacles.

FIG. 3 shows a pair of spectacles 100 in which each lens 10 is supplied by an independent electrical circuit. This circuit comprises, for each lens, an electrical voltage source 12, two supply connections 13 and a switch 14 that are carried by the side 11 of the frame located on the same side as the lens. However, it should be understood that other electrical circuits may alternatively be used, comprising for example a single electrical voltage source 12 and a single switch 14 to deliver the same electrical signal to both lenses 10. These are then connected so as to simultaneously activate the optical function of the two lenses 10 which is conferred by the electroactive materials thereof.

Finally, the electrical components 12-14 may also be provided on the frame, and possibly on the lenses 10, in a different manner from that shown in FIG. 3. For example, the electrical signal source 12 dedicated to one of the two lenses 10 may be integrated into the lens itself instead of being carried by the frame. A person skilled in the art will therefore understand that the invention may be carried out in many alternative ways as regards each optical component, or a pair of spectacles equipped with such components, beyond the particular embodiments that have been mentioned or described in detail above.

The invention claimed is:

1. Electrically controllable transparent optical component comprising:
   a transparent array of hermetically sealed cells juxtaposed parallel to one surface of the component; and
   two transparent electrodes parallel to the surface of the component and lying opposite each other in a direction normal to said surface of the component,
   the component being characterized in that several juxtaposed cells are located between said two electrodes and contain different respective electro-active materials, so that said cells exhibit different respective variations in at least one optical quantity in response to an electrical signal applied to the two electrodes, said two electrodes having an extension corresponding substantially to the entire area of the optical component,
   wherein the electroactive materials contained in at least certain of the cells located between the two electrodes exhibit different respective variations in an optical refractive index in response to the electrical signal applied to said two electrodes and exhibit a variation in the optical refractive index of greater than 0.02 in response to the electrical signal applied to said two electrodes.

2. Component according to claim 1, which additionally includes at least one quarter-wave plate, this extending parallel over the entire surface of the electrode.

3. Component according to claim 2, in which the quarter-wave plate comprises at least one colloidal mineral oxide chosen from $SiO_2$, $TiO_2$, $ZrO_2$, $SnO_2$, $Sb_2Oa$, $Y_2O_3$, $Ta_2O_5$ and mixtures thereof, the thickness of said plate being between 60 nm and 100 nm, preferably between 70 nm and 90 nm and very preferably between 80 nm and 90 nm.

4. Component according to claim 1, in which some of the cells located between the two electrodes contain different respective electroactive materials and other cells located between the two electrodes contain non-electroactive materials so that said materials are not sensitive to an electrical signal applied to the two electrodes.

5. Component according to claim 4, comprising several pairs of transparent electrodes parallel to the surface of the component, each pair of electrodes being placed opposite each other in a parallel direction normal to said surface of the component, and having an extension corresponding to the regions formed by the cells containing electroactive materials.

6. Component according to claim 1, in which the cells located between the electrodes occupy a corresponding portion of the surface of the component with a fill factor of greater than 95%.

7. Component according to claim 1, which furthermore includes a film of a plastic having a thickness of between 10 nm and 500 nm located between said electrodes and said cells, said film conformally covering the top of the walls separating said cells and the electroactive materials contained in said cells.

8. Component according to claim 7, in which the plastic film is a poly (para-xylylene) film.

9. Component according to claim 1, in which the cells each have at least one dimension (d) of between 1 μm and 500 μm, measured parallel to the surface of the optical component.

10. Component according to claim 9, in which the cells each have a dimension (d) of between 5 μm and 200 μm, measured parallel to the surface of the optical component.

11. Component according to claim 1, in which said component comprises a substrate and a flexible transparent film comprising a thin structure, attached to said substrate, said thin structure comprising the array of cells and the two electrodes.

12. Component according to claim 1, in which the electroactive materials contained in at least certain of the cells are liquids or gels.

13. Optical component according to claim 4, in which the non-electroactive materials contained in at least certain of the cells are liquids or gels.

14. Component according to claim 1, in which the electroactive materials contained in at least certain of the cells located between the two electrodes comprise mixtures of at least two components of material common to said cells, the proportions of said components in the mixtures varying among certain of said cells.

15. Component according to claim 1, in which the electroactive materials contained in at least certain of the cells located between the two electrodes exhibit different respective variations in an optical refractive index in response to the electrical signal applied to said two electrodes.

16. Component according to claim 1, in which the electroactive materials contained in at least certain of the cells located between the two electrodes comprise mixtures incorporating at least one liquid crystal, the proportion of said liquid crystal in the mixtures varying among certain of said cells.

17. Component according to claim 15, in which the electroactive material contained in at least one of the cells located between the two electrodes exhibits a variation in the optical refractive index of greater than 0.02 in response to the electrical signal applied to said two electrodes.

18. Optical component according to claim 1, in which the electroactive material contained in at least one of the cells located between the two electrodes exhibits a variation in the optical refractive index of between 0.02 and 0.2 in response to the electrical signal applied to said two electrodes.

19. Optical component according to claim 1, in which the electroactive material contained in at least one of the cells located between the two electrodes exhibits a variation in the optical refractive index of greater than 0.2 in response to the electrical signal applied to said two electrodes.

20. Component according to claim 1, in which the electroactive materials contained in the cells located between the two electrodes are selected in such a way that a deformation of a wavefront of light passing through said component varies in response to the electrical signal applied to said two electrodes.

21. Component according to claim 1, in which the electroactive materials contained in the cells located between the two electrodes are selected in such a way that a holographic grating formed by said cells varies in response to the electrical signal applied to said two electrodes.

22. Component according to claim 1, comprising an optical lens.

23. Component according to claim 22, in which the electroactive materials contained in the cells located between the two electrodes are selected in such a way that the optical power of a portion of the lens corresponding to the electrodes varies in response to the electrical signal applied to said two electrodes.

24. Component according to claim 22, in which the electroactive materials contained in the cells located between the two electrodes are selected in such a way that a correction of at least one optical aberration of a portion of the lens corresponding to the electrodes varies in response to the electrical signal applied to said two electrodes.

25. Optical component according to claim 24, in which the optical aberration is a geometric aberration.

26. Optical component according to claim 24, in which the optical aberration is a chromatic aberration.

27. Component according to claim 22, in which the lens is a contact lens.

28. Optical component according to claim 22, comprising an optical instrument lens intended for measuring, displaying or forming an image.

29. Component according to claim 22, in which the lens is an ophthalmic lens suitable for being fitted into the frame of a pair of spectacles.

30. Optical component according to claim 22, in which the lens is a mask suitable for forming a one-piece viewing and/or protection element.

31. Component according to claim 27, in which the electroactive materials contained in at least certain of the cells located between the two electrodes are selected in such a way that a progressive lens design varies in response to the electrical signal applied to the two electrodes.

32. Pair of spectacles comprising a frame and an optical component according to claim 29, fitted into said frame.

33. Pair of spectacles according to claim 32, which furthermore includes an electrical signal source and electrical connections, two of said connections connecting the two electrodes of the optical component to the electrical signal source so as to deliver the electrical signal to the optical component.

34. Pair of spectacles according to claim 33, in which the electrical signal source is supported by the frame.

35. Pair of spectacles according to claim 32, which furthermore includes a control device suitable for controlling the transmission of the electrical signal between the source of said electrical signal and the optical component.

\* \* \* \* \*